US008768357B2

(12) United States Patent
Tinnakornsrisuphap et al.

(10) Patent No.: US 8,768,357 B2
(45) Date of Patent: Jul. 1, 2014

(54) CHANGES OF FORWARD-LINK AND REVERSE-LINK SERVING ACCESS POINTS

(75) Inventors: Peerapol Tinnakornsrisuphap, San Diego, CA (US); Fatih Ulupinar, San Diego, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 916 days.

(21) Appl. No.: 12/109,043

(22) Filed: Apr. 24, 2008

(65) Prior Publication Data

US 2008/0268851 A1 Oct. 30, 2008

Related U.S. Application Data

(60) Provisional application No. 60/913,911, filed on Apr. 25, 2007, provisional application No. 60/943,434, filed on Jun. 12, 2007.

(51) Int. Cl.
*H04L 12/66* (2006.01)
*H04W 4/00* (2009.01)
*H04W 36/00* (2009.01)
*H04W 72/00* (2009.01)

(52) U.S. Cl.
USPC ........... 455/436; 455/437; 455/450; 455/453; 370/356; 370/328

(58) Field of Classification Search
CPC ...... H04L 69/40; H04W 36/02; H04W 36/08; H04W 48/20; H04W 76/04
USPC ........... 455/436, 437, 450, 453; 370/356, 328
See application file for complete search history.

(56) References Cited

U.S. PATENT DOCUMENTS 6,263,207 B1 7/2001 Kito
6,501,954 B2 12/2002 Kito
7,369,573 B2 5/2008 Ozluturk
(Continued)

FOREIGN PATENT DOCUMENTS

CN 1211153 A 3/1999
CN 1947377 A 4/2007
(Continued)

OTHER PUBLICATIONS

"Interoperability Specification (IOS) for Ultra Mobile Broadband (UMB) Radio Access Network Interfaces," 3GPP2 (Nov. 30, 2007) XP002507013.
(Continued)

*Primary Examiner* — Opiribo Georgewill
(74) *Attorney, Agent, or Firm* — Howard Seo

(57) ABSTRACT

In a communication system in which a mobile station accessing the main network via a plurality of base stations, the mobile station can freely select any of the base stations as a forward link (FL) serving station. In addition, the mobile station can also freely select another or the same base station as a reverse link (RL) serving station. The mobile station has stored in its memory a plurality of routes corresponding to the plurality of base stations, with each route dedicatedly assigned to a particular base station. During handoff of one base station to another as either the FL or the RL serving station, exchanged data packets are processed in the respective routes of the base stations involved.

32 Claims, 5 Drawing Sheets

(56) References Cited

U.S. PATENT DOCUMENTS

| | | | |
|---|---|---|---|
| 2001/0027106 A1* | 10/2001 | Kito | 455/453 |
| 2004/0125795 A1* | 7/2004 | Corson et al. | 370/356 |
| 2005/0047329 A1* | 3/2005 | Almog et al. | 370/225 |
| 2005/0254454 A1* | 11/2005 | Ozluturk | 370/328 |
| 2006/0286996 A1 | 12/2006 | Julian et al. | |
| 2007/0171875 A1 | 7/2007 | Suda | |

FOREIGN PATENT DOCUMENTS

| | | | |
|---|---|---|---|
| EP | 0892570 A2 | 1/1999 | |
| JP | 1175264 A | 7/1989 | |
| JP | 9186704 A | 7/1997 | |
| JP | 2000269881 | 9/2000 | |
| JP | 2001339752 A | 12/2001 | |
| JP | 2002125254 A | 4/2002 | |
| JP | 2005012718 A | 1/2005 | |
| JP | 2005217626 A | 8/2005 | |
| JP | 2006246481 A | 9/2006 | |
| JP | 2007537671 A | 12/2007 | |
| RU | 2282950 | 8/2006 | |
| RU | 2284675 C2 | 9/2006 | |
| WO | 9804094 | 1/1998 | |
| WO | WO0247407 A2 | 6/2002 | |
| WO | 02065797 | 8/2002 | |
| WO | WO02096146 A1 | 11/2002 | |
| WO | WO2004030396 A1 | 4/2004 | |
| WO | 2005081428 A1 | 9/2005 | |
| WO | WO2005109689 A1 | 11/2005 | |
| WO | 2005115020 A2 | 12/2005 | |
| WO | 2006138570 | 12/2006 | |
| WO | 2008029732 A1 | 3/2008 | |

OTHER PUBLICATIONS

International Search Report, PCT/US2008/061624—International Search Authority—European Patent Office, Dec. 16, 2008.
Written Opinion, PCT/US2008/061624—International Search Authority—European Patent Office, Dec. 16, 2008.
Eunyong, HA, et al. "A New Pre-Handoff Scheme for Picocellular Networks." Personal Wireless Communications, 1996. IEEE International Conference on New Delhi, India Feb. 19-21, 1996, New York, NY, USA, IEEE, US, Feb. 19, 1996, pp. 140-143, XP010158301.
International Search Report-PCT/US08/061624-International Search Authority-Partial International Search Report-European Patent Office—Sep. 18, 2008.
Taiwan Search Report—TW097115410—TIPO—Feb. 21, 2012.
Taiwan Search Report—TW097115410—TIPO—Mar. 1, 2013.
"A Study on delay and jitter reduction in hand-off methods for Mobile IPv6", Technical Report of the Institute of Electronics, Information and Communication Engineers, Japan, IEICE, Nov. 7, 2003, vol. 103, No. 425.
Knisely, D et al., "UMB Forward-link and Reverse-link Serving AN Switch Call Flows", A40-20070326-xxxr0 UMB FLSA+RLSA Switching (AAHNQ), Mar. 2007.
Knisely, D et al., "UMB Forward-link and Reverse-link Serving an Switch Call Flows", A40-20070514-xxxr0 UMB FLSA+RLSA Switching (AAHNQ), May 2007.
Koodli, R., "Fast Handovers for Mobile IPv6draft-ietf-mobileip-fast-mipv6-06.txt", Mobile IP Working Group Internet Draft, Mar. 1, 2003.
Ogawa, T., "A study on seamless handover method using enhanced DHCP," Technical Report of the Institute of Electronics, Information and Communication Engineers, Japan, IEICE, Dec. 10, 2004, vol. 104, No. 516, pp. 27-30.

* cited by examiner

CHANGES OF FORWARD-LINK AND REVERSE-LINK SERVING ACCESS POINTS

CLAIM OF PRIORITY UNDER 35 U.S.C §119

The present application for patent claims priority to U.S Provisional Application Nos. 60/913,911 and 60/943,434, filed on Apr. 25, 2007 and Jun. 12, 2007, respectively, and all are assigned to the assignee hereof and expressly incorporated by reference herein.

BACKGROUND

I. Field

The present invention generally relates to communications, and more particularly, to switching of serving access points in wireless communication systems.

II. Background

In telecommunications, especially wireless communications, communication environments are not static but rather dynamic. In a mobile communication setting, some mobile communication entities, commonly called the mobile stations, may move to different locations under different communication conditions at different times.

In a wireless network, the mobile station accesses the main network via certain infrastructure communication entities, commonly called the base stations.

The communication connection in which data flow from the base station to the mobile station is called the forward link (FL). Likewise, the communication connection in which data flow from the mobile station to the base station is called the reverse link (RL). Communication conditions are not always the same for both the FL and the RL. For example, a mobile station may be communicating with a serving base station which has a highly congestive RL traffic but a relatively open FL flow. For the mobile station to stay with the base station for both FL and the RL while a better RL is available from other base stations may not be the best use of communication resources.

In addition, for a mobile station to change from one base station to another to access the main network, be it for a FL change or a RL change, it is preferable that the data packets exchanged during and after the change remain intact. This is especially true for time-sensitive data packets, such as data packets exchanged in a Voice over IP (VoIP) call. Unlike elastic or best-effort data packets, erroneous or missed time-sensitive packets during transmissions are not always resent. Thus, disruptions of time-sensitive data packets during change of base stations can affect quality of services.

Accordingly, there is a need for the mobile station to freely select any serving communication entities for the assignment of the FL and the RL, so as to adaptively and efficiently utilize available communication resources, yet maintaining data integrity during the handoff process.

SUMMARY

In a communication system in which a mobile station accessing the main network via a plurality of base stations, the mobile station can freely select any of the base stations as a forward link (FL) serving station. In addition, the mobile station can also freely select another or the same base station as a reverse link (RL) serving station. The mobile station has stored in its memory a plurality of routes corresponding to the plurality of base stations, with each route dedicatedly assigned to a particular base station. During handoff of one base station to another as either the FL or the RL serving station, exchanged data packets are processed in the respective routes of the base stations involved. Furthermore, the routes are also relied upon to process partially transferred data packets, thereby allowing transparent and seamless transfer of data during the handoff processes.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Furthermore, in the following description, for reasons of conciseness and clarity, terminology associated with the Ultra Mobile Broadband (UMB) technology as promulgated under the $3^{rd}$ Generation Partnership Project 2 (3GPP2) by the Telecommunication Industry Association (TIA) is used. It should be emphasized that the invention is also applicable to other technologies, such as technologies and the associated standards related to the Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, the mobile station can sometimes be called a mobile terminal, a user equipment, a subscriber unit, etc., to name just a few. Likewise, the base stations can sometimes be called an access point, a Node B, and so forth. It here should be noted that different terminologies apply to different technologies when applicable.

Figure 1:
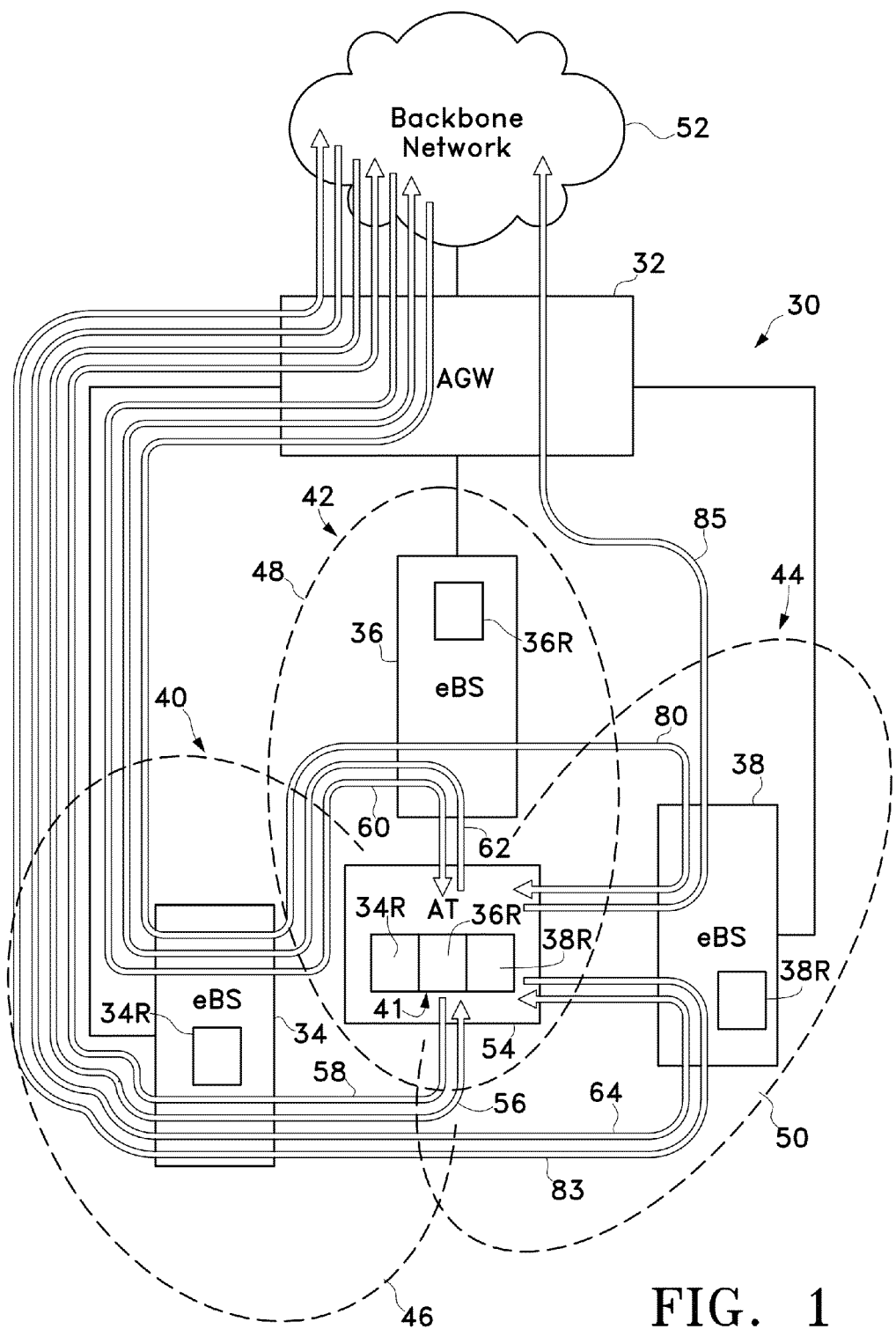
FIG. 1 is a simplified schematic drawing illustrating the relationships of the various communication entities arranged in accordance with an exemplary embodiment of the invention.

Reference is now directed to FIG. 1 which schematically shows the relationships of the various communication entities arranged in accordance with an exemplary embodiment of the invention.

In FIG. 1, the overall communication system is generally signified by the reference numeral 30. In the communication system 30, there is an Access Gateway (AGW) 32 linked to a plurality of evolved Base Stations (eBSs), three of which are shown as eBS 34, eBS 36 and eBS 38. The eBSs 34, eBS 36 and eBS 38 can be installed in the same Access Network (AN) or in different ANs. In this example, the eBSs 34, 36 and 38 are parts of ANs 40, 42 and 44, respectively. Each of the ANs 40, 42 and 44 may include one or more eBSs and other entities. For the sake of clarity and conciseness, each AN is shown with only one eBS in FIG. 1. Thus, in the embodiment as shown in FIG. 1, the eBS 34 provides wireless access to users within a coverage area 46. Likewise, the eBSs 36 and 38 provide wireless access within coverage areas 48 and 50, respectively.

The AGW 32 has linkage to a backbone network 52, which can be the Internet, for instance. Alternatively, the backbone network 52 can be an intranet in a closed network, as another example.

Suppose there is an Access Terminal (AT) 54 deployed within the system 30. The AT 54 operated by a user (not shown) is capable of moving among the various radio networks, including the AN 40, AN 42 and the AN 44. The AT 54 can access the backbone network 38 via various communication entities in the system 30.

Suppose the AT 54 initially communicates with the eBS 34. The AT 54 first needs to establish a Forward Link (FL) with the eBS 34 such that data from the backbone network 52 can flow to the AT 54 via the AGW 32 and the eBS 34, as shown by the logical data path denoted by the reference numeral 56 in FIG. 1. Because the AT 54 directly receives FL data packets from the eBS 34, the eBS 34 is also called the Forward-Link Serving eBS (FLSE) for the AT 54.

In a somewhat similar manner, the AT 54 also needs to establish a Reverse Link (RL) with the eBS 34 such that data from the AT 54 can flow to the backbone network 52 via the eBS 34 and the AGW 32, as shown by the logical data path 58 in FIG. 1. Because the AT 54 directly sends RL data packets to the eBS 34, the eBS 34 is also called the Reverse-Link Serving eBS (RLSE) for the AT 54.

As shown in FIG. 1, the AT 54 exchanges data with the eBS 34 via the logical data paths 56 and 58 as FL and RL, respectively. In this example, the eBS 34 assumes the dual roles as both the FLSE and RLSE for the AT 54.

In addition, in this example, the eBS 34 also serves as a Data Attachment Point (DAP) for the AT 54. When the eBS 34 becomes the FLSE for the AT 54, it may start the DAP assignment process. To accomplish this end, the eBS 34 sends a registration request message to the AGW 32. Thereafter, the AGW 32 performs a binding update with the eBS 34 in accordance with the procedures as set forth under the Proxy Mobile IP (PMIP) protocol published by the Internet Engineering Task Force (IETF). In essence, the DAP 34 carries out the data anchoring function for the AT 54. As a consequence, in addition to assuming the roles as the FLSE and RLSE for the AT 54, in the case, the eBS 34 also serves the duty of a DAP for the AT 54. Put another way, in this example, the eBS 34 serves the triple roles as the FLSE, RLSE and DAP for the AT 54.

In accordance with the exemplary embodiment of the invention, a communication entity in the system 30, such as the eBS 54, need not assume all three roles simultaneously for any AT, such as the AT 54, and as depicted previously.

Reference is now returned to FIG. 1. Suppose the AT 54 moves to the coverage area 48 provided by the eBS 36. With closer proximity and stronger signals from the eBS 36, the AT 54 decides to handoff both the FLSE and the RLSE from the eBS 34 to the eBS 36. The handoff processes will be described later in more details.

Suppose the handoff is successful. After the handoff, for the FL, data packets from the backbone network 52 flow to the AT 54 via the AGW 32, the eBS 34 and the eBS 36, in the enumerated order as indicated by the logical data path 60 shown in FIG. 1. Likewise, for the RL, data packets from the AT 54 flow to backbone network 52 via the eBS 36, the eBS 34 and the AGW 32, in the enumerated order as indicated by the logical data path 62 shown in FIG. 1. In this case, the eBS 36 assumes the dual roles as the FLSE and the RLSE for the AT 54. Nevertheless, the eBS 34 still acts as the DAP for the AT 54.

Even though the AT 34 has roamed away from the coverage area 46 served by the eBS 34, the eBS 34 remains the DAP for the AT 54. The reason is because in a wireless setting, depending on the mobility of the AT 54, it is possible that the eBS 34 may again become the FLSE or the RLSE for the AT 54. For instance, the AT 54 may be on the boundary of the coverage areas 46 and 48 provided by the eBS 34 and the eBS 36, respectively. Consequently, the AT 54 may only communicate with the eBS 36 temporarily. However, if the communications between the AT 54 and the eBS 36 are not temporary, routing data packets via the meandering logical data paths 60 and 62 may not be an efficient usage of communication resources, at least from the perspective of backhaul utilization. In addition, data packet latency is also impacted. Instead, the DAP is preferably switched from the eBS 34 to the eBS 36. The criteria for DAP switch can be, among other things, that the AT 54 has stayed long enough in the coverage area 48 provided by the eBS 36. Fundamental procedures of the switch of the DAP can be found in a publication 3GPP2 A.S0020, published by the $3^{rd}$ Generation Partnership Project 2 (3GPP2) organized under the Telecommunication Industry Association (TIA). Suppose in this case, one or more criteria for DAP change have not been met and the eBS 34 remains as the DAP for the AT 54.

Reference is now continued with FIG. 1. Suppose the AT 54 keeps on roaming to other coverage territories. At some point in time, the AT 54 reaches the coverage area 50 provided by the eBS 38. Further suppose for some reasons, the AT 54 senses a strong FL but a comparatively weak RL from the eBS 38. Such a scenario, called the "link imbalance," can be caused by excessive frequency interference of the frequency band associated with the RL. The interference can be caused by too many ATs (not shown) in active communications with the base stations, for example. The FL traffic may not be affected much because the eBSs use different frequency bands and are further geographically farther apart. As another example, suppose the eBS 54 is overloaded with RL connections from other ATs (not shown) but the FL traffic is still relatively sparse. Under such a scenario, the AT 54 may decide to switch the FLSE from the eBS 36 to the eBS 38, but maintains the eBS 36 as the RLSE for the AT 54.

For the RL, data packets from the AT 54 flow to the backbone network 52 via the logical data path 62 as previously described. However, for the FL, data packets from the backbone network 52 flow to the AT 54 via the AGW 32, the eBS 34, and the eBS 38, in the enumerated order and as indicated by the data path 64 shown in FIG. 1. In this case, three different communication entities assume three different roles. Specifically, with respect to the AT 54, the eBS 34 acts as the DAP; the eBS 36 performs the duty as the RLSE; and the eBS 38 takes on the role as the FLSE.

For reliability in wireless communications and further for efficient usage of communication resources, it is preferably the AT 54 can freely select a particular communication entity to perform a particular role. The exemplary embodiment further described hereinbelow addresses the aforementioned needs.

In accordance with the exemplary embodiment, the AT 54 has a Route Set (RS) 41 in its memory. The RS 41 includes information of a set of communication entities, such as the eBS 36 and the eBS 38, that have air-interface routes with the AT 54, whereby each entity in the RS 41 may tunnel both the link-layer packets and the Internet Protocol (IP) packets with the AT 54, and vice versa. In addition, the AT 54 updates the RS 41 whenever an eBS joins or leaves the RS.

A specific communication entity has a specific route in the RS 41 of the AT 54. For instance, as shown in FIG. 1, the AT 54 has the route 34R in the RS 41 reserved for the eBS 34. Likewise, the AT 54 has the route 36R in the RS 41 reserved for the eBS 36. The AT 54 has the route 38R in the RS 41 reserved for the eBS 38.

A route essentially is a set of protocols and parameters particular to an AT and the communication entity which the AT communicates with in a communication session. Such protocols and parameters include, for example, header compression protocols and configurations, Radio Link Protocol (RLP) configurations and sequence numbers, ciphering algorithm and negotiated security keys, etc.

In the RS 41 of the AT 54, each of the routes 34R, 36R and 38R need not include the same protocols and configurations. Instead, the routes 34R, 36R and 38R can be logically separate from one another. That is, the routes 34R, 36R and 38R are separately used to process data packets tunneled to and from the respective communication entities 34, 36 and 38. By way example, in FIG. 1, when the AT 54 relies on the eBS 38 as the FLSE, the route 38R stores the protocols and parameters, among other things, the data packet sequence numbers associated with the radio link portion of the logical data path 64, which is the radio link portion of the FL the eBS 38 sends data to the AT 54.

As mentioned earlier, the routes, such as routes 34R, 36R and 38R can be stored in the memory of the AT 54. In addition, each individual route associated with the particular communication entity can be stored in that communication entity. For example, the route 38R is stored in the eBS 38, as shown in FIG. 1. The hardware implementation for the AT 54 and for the other communication entities in this respect, including the memory circuitry carrying the routes, will be described further later.

For a change of an access point, the AT 54 needs to exchange different messages with the relevant entities. For purpose of illustration, FIG. 2 shows the call flows for the AT 54 with other communication entities in establishing the eBS 38 as the FLSE via the logical data path 64 as shown in FIG. 1.

Figure 2:
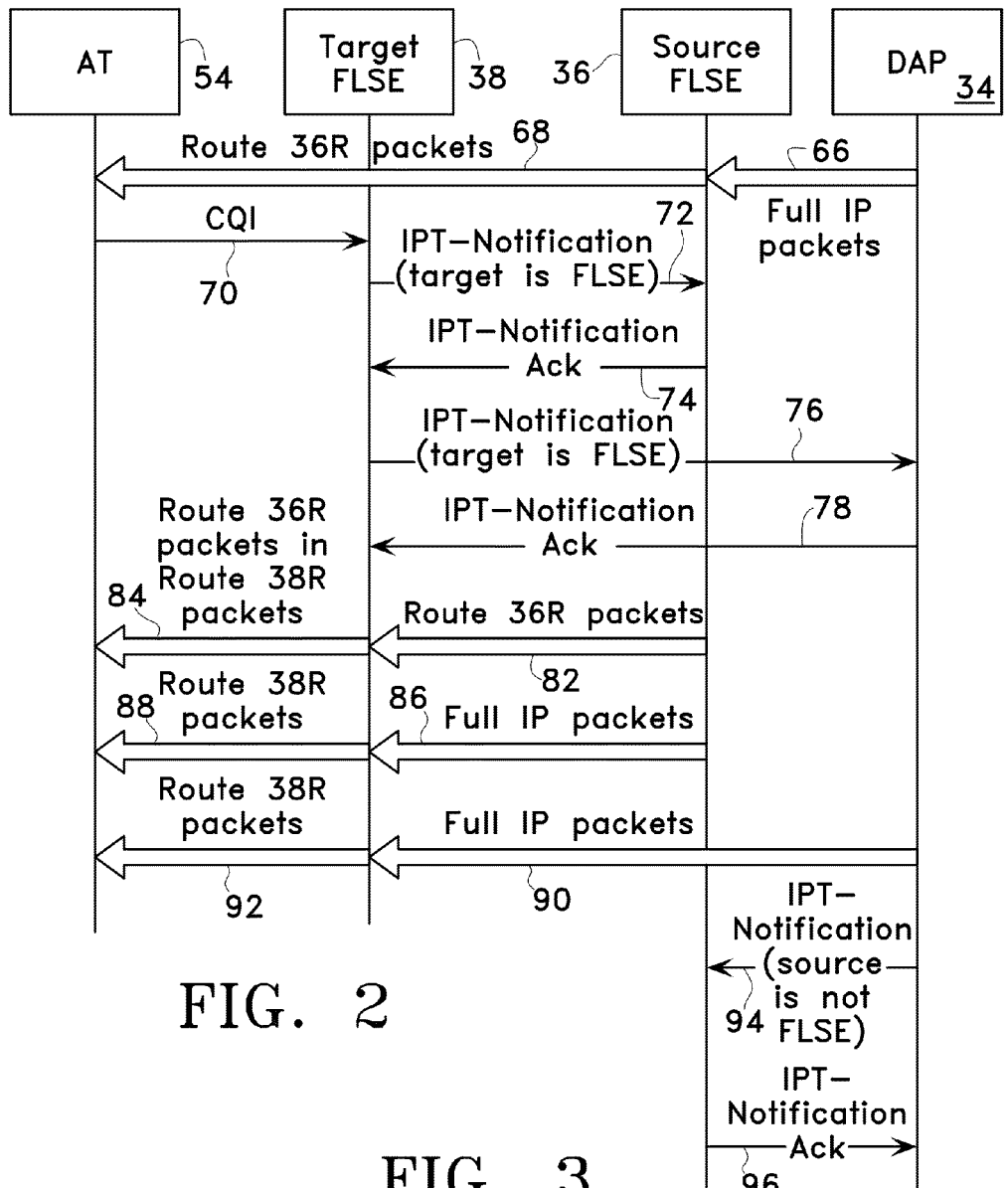
FIG. 2 is call flow diagram which shows the message and data flows among the different communication entities during a forward link serving station handoff operating in accordance with the exemplary embodiment.

Reference is now directed to FIG. 2 in conjunction with FIG. 1. For ease of explanation, the eBS 38 is called the target FLSE. Likewise, the eBS 36 is called the source FLSE. The eBS 34 acts as the DAP in this case.

The AT 54 initially relies on the eBS 36 as the FLSE. Consequently, the AT 54 receives Internet Protocol (IP) data packets from the DAP, which is the eBS 34 in this case, via the source FLSE, the eBS 36 in this case, as shown by the logical data paths 66 and 68, respectively, in FIG. 2.

As mentioned earlier, suppose the AT 54 moves closer to the vicinity of the coverage area 50 and detects strong FL signals from the eBS 38. The AT 54 decides to select the eBS 38 as the target FLSE. That is, the AT 54 determines to handoff the FLSE from eBS 36 to the eBS 38. The criteria for such handoff can be based on a set of communication conditions, such as better link conditions with the eBS 38, comparison of loadings of the eBS 36 and the eBS 38, durations of usage with respect to the eBS 36 and eBS 38, and so forth.

The AT 54 selects the eBS 38 as the target FLSE by sending the eBS 38 a message, or a physical layer signal such as a Channel Quality Indicator (CQI), as indicated by the message path 70 shown in FIG. 2.

Upon receipt of the message, the target FLSE 38 notifies all other eBSs in the RS of the AT 54 that the eBS 38 takes over the role as the FLSE for the AT 54.

The notifications by the target FLSE 38 can be sent out to the other entities simultaneously or sequentially. For example, the notification to the source FLSE 36 is in the form of an IPT (IP Tunnel)-Notification message via the message path 72 as shown in FIG. 2. The source FLSE 36 acknowledges receipt of the IPT-Notification message by sending the target FLSE 38 a IPT-Notification Ack message via the message path 74 as shown in FIG. 2.

As another example, the target FLSE 38 also sends to the DAP 34 the IPT-Notification message via the message path 76 as shown in FIG. 2. Likewise, the DAP 34 acknowledges receipt of the IPT-Notification message by sending the source FLSE 38 a IPT-Notification Ack message via the message path 78 as shown in FIG. 2.

For the source FLSE 36, upon receipt of the IPT-Notification message, i.e., the message sent via the message path 72, the source FLSE 36 needs to transfer or tunnel the received IP packets from the DAP 34 to the target FLSE 38, instead of to the AT 54.

Figure 3:
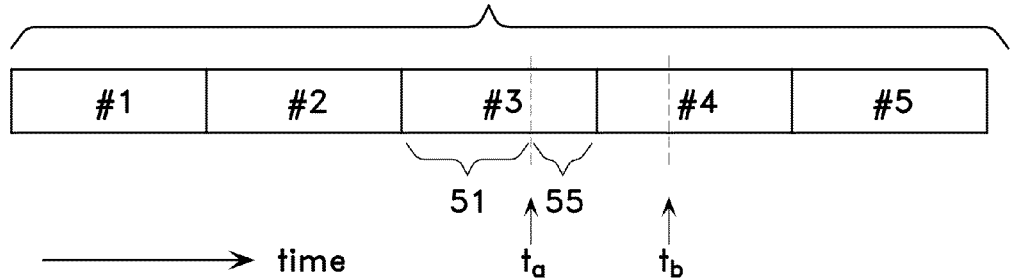
FIG. 3 schematically shows a diagram of IP data packet flows in which different communication entities are responsible for tunneling of different IP data packets.

In accordance with this embodiment, the source FLSE 36 need not tunnel discrete IP packets as defined by the IP packet frames to the target FLSE 38. Instead, the source FLSE 36 can tunnel partial IP packets to the target FLSE 38. More specifically, reference is now referred to FIG. 3 which schematically shows a diagram of IP data packets flow to the source FLSE 36 as time progresses. Shown in FIG. 3 are 5 IP packets, namely IP Packets #1-#5, as delineated by 5 IP packet frames. Suppose at time $t_a$, the source FLSE 36 receives the IPT-Notification message as via the message path 72 (FIG. 2). For the whole IP Packets #1 and #2 which are received prior to the time $t_a$, the source FLSE 36 encapsulates these IP packets with link layer headers destined for the AT 54 and sends the IP packets to the AT 54. Phrased differently, the source FLSE 36 sends the IP Packets #1-2 to the AT 54 via the link layer tunnel through the radio link part of the logical data path 60 (FIG. 1).

For the AT 54, as mentioned earlier, it has a route, specifically the route 36R (FIG. 1), reserved for the processing of the link layer tunnel packets received from the eBS 36.

As for the partial portion of the IP Packet #3, identified by the reference numeral 51 in FIG. 3, which is received by the source FLSE 36 prior to the time $t_a$, the source FLSE 36 sends the partial IP Packet #3 51 to the AT 54 in similar manner as for the whole IP Packets #1 and #2. That is, the source FLSE 36 partitions the partial IP Packet #3 51 and fits the partitioned parts into the link layer frames for transmission to the AT 54 through the radio link prt of the logical data path 60 as shown in FIG. 1 (in FIG. 2, it is represented by the logical data path 68). Again, the AT 54 receives and processes the partial IP Packet #3 51 in similar fashion as that for the whole IP Packets #1 and #2.

As for the partial portion of the IP packet #3, identified by the reference numeral 55, which is received by the source FLSE 36 after the time $t_a$, the source FLSE 36 processes the partial packet 55 (e.g., encrypting and/or adding RLP headers) using the route 36R in the source FLSE 36 and then sends this partial IP Packet #3 55 to the target FLSE 38 through the backhaul part of the logical data path 80 in FIG. 1 (in FIG. 2, it is represented by the logical data path 82).

Upon receipt of the partial IP Packet #3 55, the target FLSE 38 further processes the partial packet 55 (e.g., including the RLP headers added by the route 36R) using the route 38R in the target FLSE 38, and then sends the partial IP Packet #3 55 to the AT 54 via the radio link part of the logical data path 80 in FIG. 1 (in FIG. 2, it is represented by the logical data path 84).

For the partial IP Packet #3 55, the AT 54 first processes the partial packet 55 using the route 38R in the AT 54. Thereafter, the AT 54 processes the partial packet 55 using the route 36R in the AT 54. Differently put, the AT 54 receives the tunneled partial IP Packet #3 55 from the source FLSE 36 via the target FLSE 38 as if the AT 54 receives the partial packet 55 logically from the source FLSE 36.

Thus, with the partial IP Packets #3 51 and 55 received before and after $t_a$ processed in route 36R, reconstruction of the entire IP packet #3 is feasible. Allowing partial data packets to be combined as described above, the consequential benefits are that over-the-air resources can be more efficiently used as each data packet segment is only transmitted once. Furthermore, a seamless handoff with in-order data packet delivery can be achieved.

It should be noted that while the partial data packets are combined and processed as described above in this embodiment, full data packets can be combined and processed similarly if needed.

As an alternative, for purpose of additional reliability, the source FLSE 36 may transmit the IP Packet #3 via both the logical paths 60 and 80 (FIG. 1). The route 36R in the AT 54 may receive duplicate copies of certain parts of the IP Packet #3. However, the AT 54 may discard the duplicate parts via the duplicate detection mechanism in the RLP, as known in the art.

If there are any remaining IP data packets in the source FLSE 36, the source FLSE 36 sends the remaining packets to the target FLSE 38, which in turn processes the packets using the route 38R in the target FLSE 38 and then sends the processed packets to the AT 54 via the logical data path 80 as shown in FIG. 1 (in FIG. 2, the logical data paths depicted above are identified by the reference numerals 86 and 88, respectively). Upon receipt of the data packets, the AT 54 processes the packets using the route 38R stored in the AT 54.

As for the DAP 34, suppose at time $t_b$ (FIG. 3), the DAP 34 receives the IPT-Notification message via the message path 76 (FIG. 2). For the whole IP Packets #1-#3 which are received prior to the time $t_b$, the DAP 34 tunnels the IP Packets #1-#3 to the source FLSE 36, which in turn handles the received IP packets in a manner as similarly described above. However, for IP packet #4, the DAP 34 tunnels the entire packet to the source FLSE 36, as the DAP 34 is aware that the source FLSE 36 would properly handle any partially received IP packets. That is, for the IP Packets #1-#4, the DAP 34 sends the data packets to the AT 54 via the source FLSE 36 through the logical data path 60 as shown in FIG. 1 (in FIG. 2, the logical data paths depicted above are identified by the reference numerals 68 and 66, respectively).

For any IP packets received after the time $t_b$, such as the IP Packet #5 shown in FIG. 3, the DAP 34 tunnels the packets to the target FLSE 38 which in turn handles the packet via the logical data path 64 shown in FIG. 1 as mentioned previously (in FIG. 2, the logical data paths are identified by the reference numerals 90 and 92, respectively). Upon receipt of the packets, the AT 54 processes the packets in the route 38R (FIG. 1), also as described previously.

Reference is now returned to FIG. 2 in conjunction with FIG. 3. More briefly stated, for the source FLSE 36, full or partial IP packets received from the DAP 34 before the time $t_a$ are tunneled to the AT 54, as indicated by the logical data path 60 shown in FIG. 1. However, for the source FLSE 36, full or partial IP packets received from the DAP 34 after the time $t_a$ are tunneled to the target FLSE 38, as indicated by the backhaul part of the logical data path 80 shown in FIG. 1. The target FLSE 38 thereafter tunnels the received partial and full IP packets to the AT 54, as indicated by the radio link parts of the logical data paths 80 and 64, respectively, as shown in FIG. 1.

Likewise, for the DAP 34, full IP packets received before or during the time $t_b$ are sent to the source FLSE 36, as indicated by the backhaul part of the logical data path 60 shown in FIG. 1. However, full IP packets received after the time $t_b$ are tunneled to the target FLSE 38 as indicated by the backhaul part of the logical data path 64 shown in FIG. 1. Afterward, the target FLSE 38 tunnels the received full IP packets to the AT 54, as indicated by the radio link part of the logical data path 64 shown in FIG. 1.

What follows is the notification to the source FLSE 36 that it is no longer the serving FLSE. To accomplish this end, the DAP 34 sends an IPT-Notification message to the source FLSE 36 informing the FLSE 36 to the discharge of the duty as the serving FLSE for the AT 54, via the message path 94 as shown in FIG. 2.

The source FLSE 36 responds with an IPT-Notification Ack message via the message path 96 shown in FIG. 2.

The above-mentioned notification by exchanging messages via the paths 94 and 96, is called "negative notification" hereinbelow. The negative notification serves as an additional safeguard that the FLSE or the RLSE is correctly assigned. In the event that there is inconsistence, a corrective mechanism can be installed for rectification and will be explained further later.

Described above is the AT 54 selects the eBS 38 as the serving FLSE. Suppose the AT 54 determines that the RL conditions are more favorable to that of the current serving RLSE, the eBS 36 in this case, and that there appears to be not much of an advantage in switching the serving FLSE from the eBS 36 to the eBS 38. Under such scenario, the AT 54 may initiate the handoff of the RLSE from the eBS 36 to the eBS 38.

There are certain aspects that the handoff of the RLSE are different from the corresponding handoff for the FLSE. During the FLSE handoff, or for the FL data flow in general, since the AT may communicate with any communication entities at will, a DAP is needed as a data anchoring entity so as to direct the proper FL data flow to the community entity the AT 54 eventually decides to communicate with. However, during a corresponding RLSE handoff, or for the RL data flow in general, there may not be any need for a DAP as the data anchoring entity. The reason is any communication entity receiving RL data flow from the AT can straightforwardly send the received data to the AGW. In fact, this approach is preferred because it further streamlines backhaul utilization.

By way of example, reference is now returned to FIG. 1. As described earlier, during the FLSE handoff from the source eBS 36 to the target eBS 38 from the logical data paths 60 and 64, respectively, a DAP acting as an anchoring entity, the eBS 34 in this case, is needed. The reason is prior to the completion of the handoff, it may not yet be settled which eBS the AT 54 eventually chooses as the target FLSE. The function of the DAP 34 is to properly direct the FL data traffic to the chosen target FLSE by the AT 54 during and after the handoff. It also needs to mention that to facilitate a FLSE handoff, all the communication entities, including the AT 54, the AGW 32, the eBSs 34, 36 and 38, need to keep track of which entity among themselves is the current FLSE for the AT 54.

As for the RLSE handoff, suppose the AT 54 decides to handoff RL data flow from the source eBS 36 to the target eBS 38. The AT 54 could have chosen to switch the RL from the logical data path 62 to the logical data path 83 as shown in FIG. 1. Specifically, sending RL data flow via the logical data path 83 relies on the eBS 34 as the DAP. However, in this example, to more efficiently utilize communication resources, the AT 54 directly sends the RL data packets through the target eBS 38 to the AGW 32 via the logical data path 85 as an alternative and as shown in FIG. 1. In this case, some communication entities, such as the eBSs 34, 36 and 38, need not keep track of which entity is the current RLSE for the AT 54. The reason is, within the communication system 30, the destination of the RL data packets is the AGW 32 which is ascertained. That is, the destination of the RL data packets is not an uncertain target.

Figure 4:
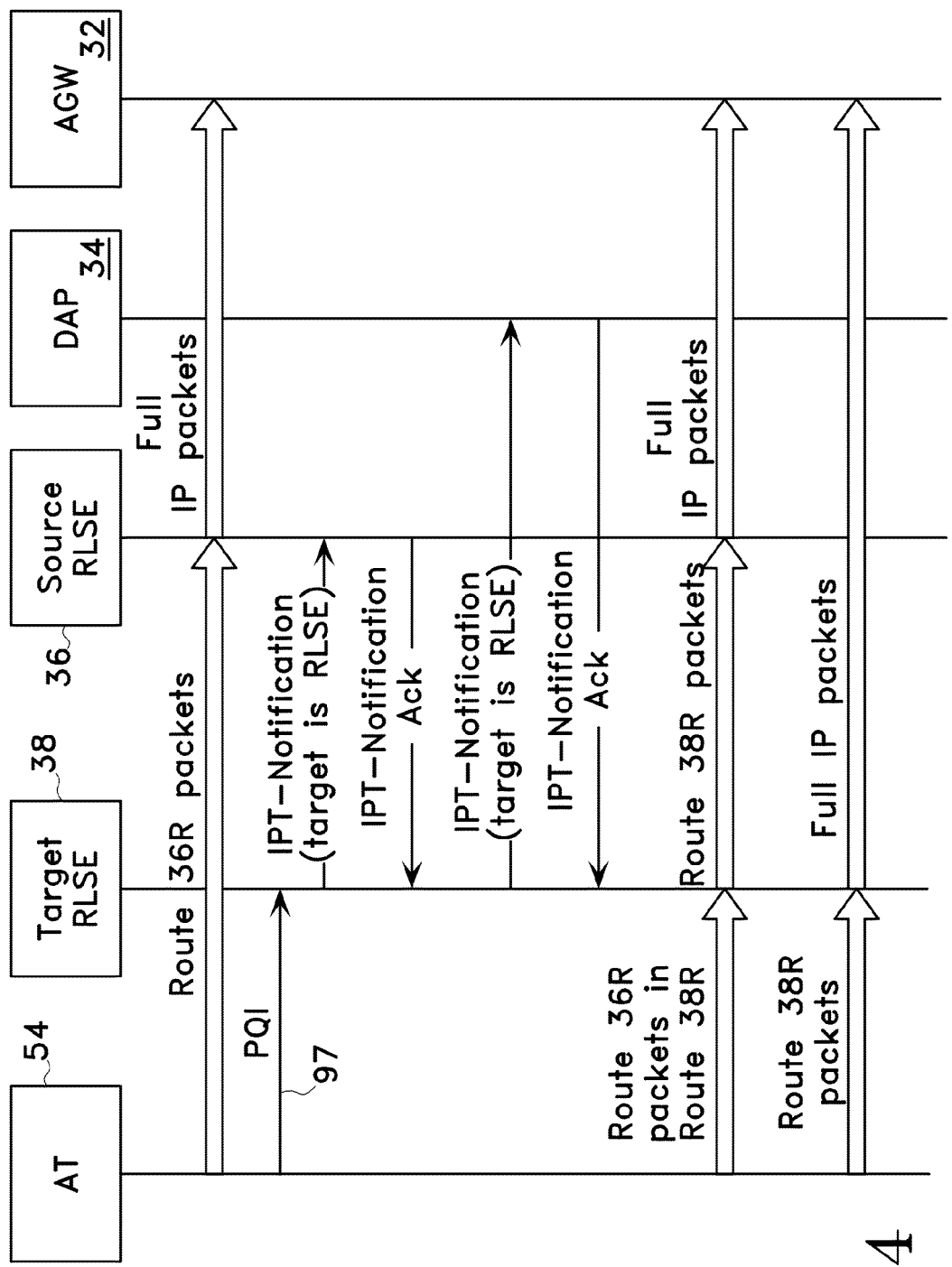
FIG. 4 is call flow diagram which shows the message and data flows among the different communication entities during a reverse link serving station handoff operating in accordance with the exemplary embodiment.

The process for handoff of the source RLSE 36 to the target RLSE 38 is substantially similar to that as described for the FLSE counterpart as explained previously but with the differences as highlighted above. Furthermore, the AT 54 requests the RLSE change by sending the target RLSE 38 a message, or a physical layer signal such as a Pilot Quality Indicator (PQI) as identified by the message path 97 shown in FIG. 4. For the sake of brevity and clarity, the RLSE handoff process is not further elaborated. Instead, the RLSE handoff from the source RLSE 36 to the target RLSE 38 from the logical data paths 62 to 85 (FIG. 1) is illustrated in FIG. 4.

Figure 5:
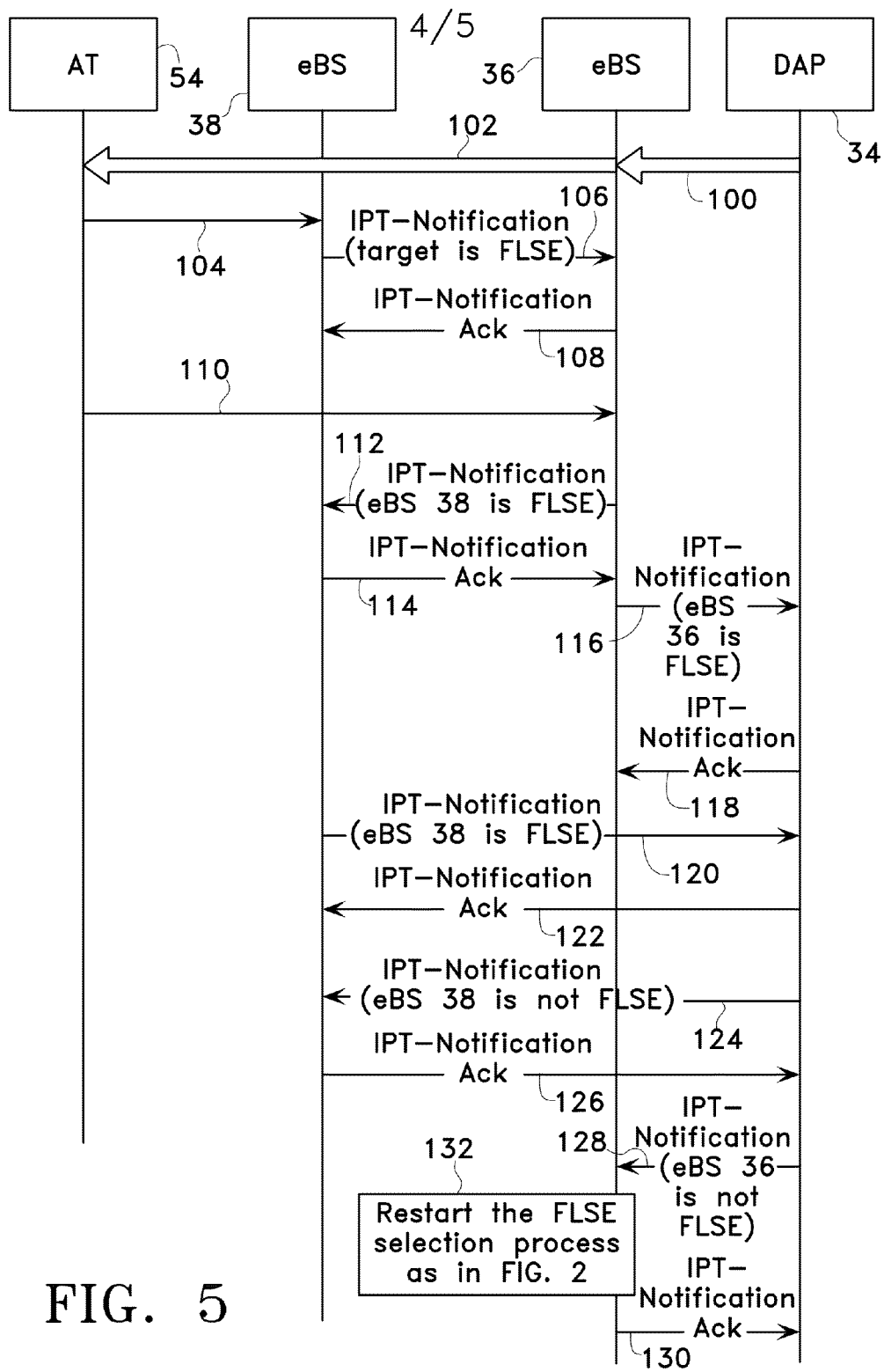
FIG. 5 is call flow diagram which shows the message and data flows among the different communication entities during a handoff in which the forward link serving station is erroneously assigned but corrected with rectification.

In the FLSE and RLSE handoff processes described above, because of the ever changing communication conditions, messaging signals do not always arrive on time. Consequently, it is possible that the intended FLSE or RLSE can be erroneously assigned. FIG. 5 illustrates an example of an erroneous FLSE assignment. In this embodiment, remedial procedures are instituted to rectify the wrong assignment.

Reference is now directed to FIG. 5. Suppose the AT 54 initially assigns the eBS 34 as the DAP and the eBS 36 as the FLSE. As such, the DAP 34 forwards IP packets to the eBS 36 which in turn tunnels the IP packets to the AT 54, via the data paths 100 and 102, respectively, as shown in FIG. 5.

Suppose the AT 54 determines that there is a better FL with the eBS 38. Weighing various predefined communication conditions, the AT 54 decides to change the FLSE from the eBS 36 to the eBS 38. The AT 54 sends to the eBS 38 a request message via the message path 104 as shown in FIG. 5.

Upon receipt of the message via the message path 104, the eBS 38 notifies all the eBSs in the RS of the AT 54 that the eBS 38 takes over the role as the FLSE for the AT 54, as typified by the IPT-Notification message sent to the eBS 36 via the message path 106 shown in FIG. 5. The eBS 36 responds with the IPT-Notification Ack message via the message path 108.

Ideally, the eBS 38 should have sent the DAP 34 without delay similar notification messages, i.e., messages sent via the message path 120 shown in FIG. 5.

However, in this example, suppose availability of such message is delayed, either untimely sent by the eBS 38 or belatedly received by the DAP 34. The reasons for the delay can be caused by the circuitry of the eBS 38 or the DAP 34. The delay can also be caused by the unfavorable communication conditions between the eBS 38 and the DAP 34.

In any event, prior to sending the IPT-Notification message which should have been timely sent via the message path 120, the eBS 38 in this example reselects the eBS 36 as the FLSE, by sending a request message via the message path 110 as shown in FIG. 5.

Again, the eBS 36 notifies all the eBSs in the RS of the AT 54 that the eBS 36 takes over the role as the FLSE for the AT 54, as typified by the IPT-Notification message sent to the eBS 38 via the message path 112 shown in FIG. 5. The eBS 38 responds with the IPT-Notification Ack message via the message path 114.

Suppose in the example, the eBS 36 timely sends to and receives from the DAP 34 the IPT-Notification message and the IPT-Notification Ack message via the message paths 116 and 118, respectively, as shown in FIG. 5. As mentioned earlier, in accordance with the exemplary embodiment, the DAP 34 also follows up with a negative notification as an additional safeguard to other eBSs that they are not the FLSE.

However, suppose at this point in time, the IPT-Notification message via the message path 120 that should have arrived earlier somehow arrives and received by the DAP 34. The DAP 34 responds with a IPT-Notification Ack message as indicated by the message path 122 shown in FIG. 5. Nevertheless, the negative notification consequential to the receipt of the IPT-Notification message which was earlier sent by the intended FLSE 36 via the message path 116 is also sent out by the DAP 34 to other eBSs. Such negative notification is sent via the message path 124 to the eBS 38, for instance, as shown in FIG. 5. Here, the eBS 38 should detect the inconsistency because earlier, it sent out notification message to other entities in the RS of the AT 54 that the eBS 38 takes on the role as the FLSE. However, the message received via the message path 124 informs the eBS 38 an inconsistent position that the eBS 38 is not the FLSE for the AT 54. The event could trigger actions for further inquiry and eventual rectification. In this embodiment, remedial actions are made by the eBS 36, the intended FLSE in the first place, as described below.

Reference is continued with FIG. 5. Consequential to the receipt of the IPT-Notification message via the message path 120, the DAP 34 also sends out negative notification messages to other eBSs in the RS of the AT 54 other than the eBS 38 that they are not the FLSE for the AT 54. One of such messages is the message sent via the message path 128 to the eBS 36 shown in FIG. 6. The eBS 36 responds with a IPT-Notification Ack message via the message path 130 shown in FIG. 5.

Here, the eBS 36 should also detect the inconsistence because earlier, it sent out notification message to other entities in the RS of the AT 54 that the eBS 36 takes on the role as the FLSE. Nevertheless, the message received via the message path 128 informs the eBS 36 an inconsistent position that the eBS 36 is not the FLSE for the AT 54. The event sets eBS 36 in motion for corrective measures. For instance, in this embodiment, the eBS 36 can on its own initiative restarts the FLSE switch process 132 as shown and described in FIG. 2 earlier.

Figure 6:
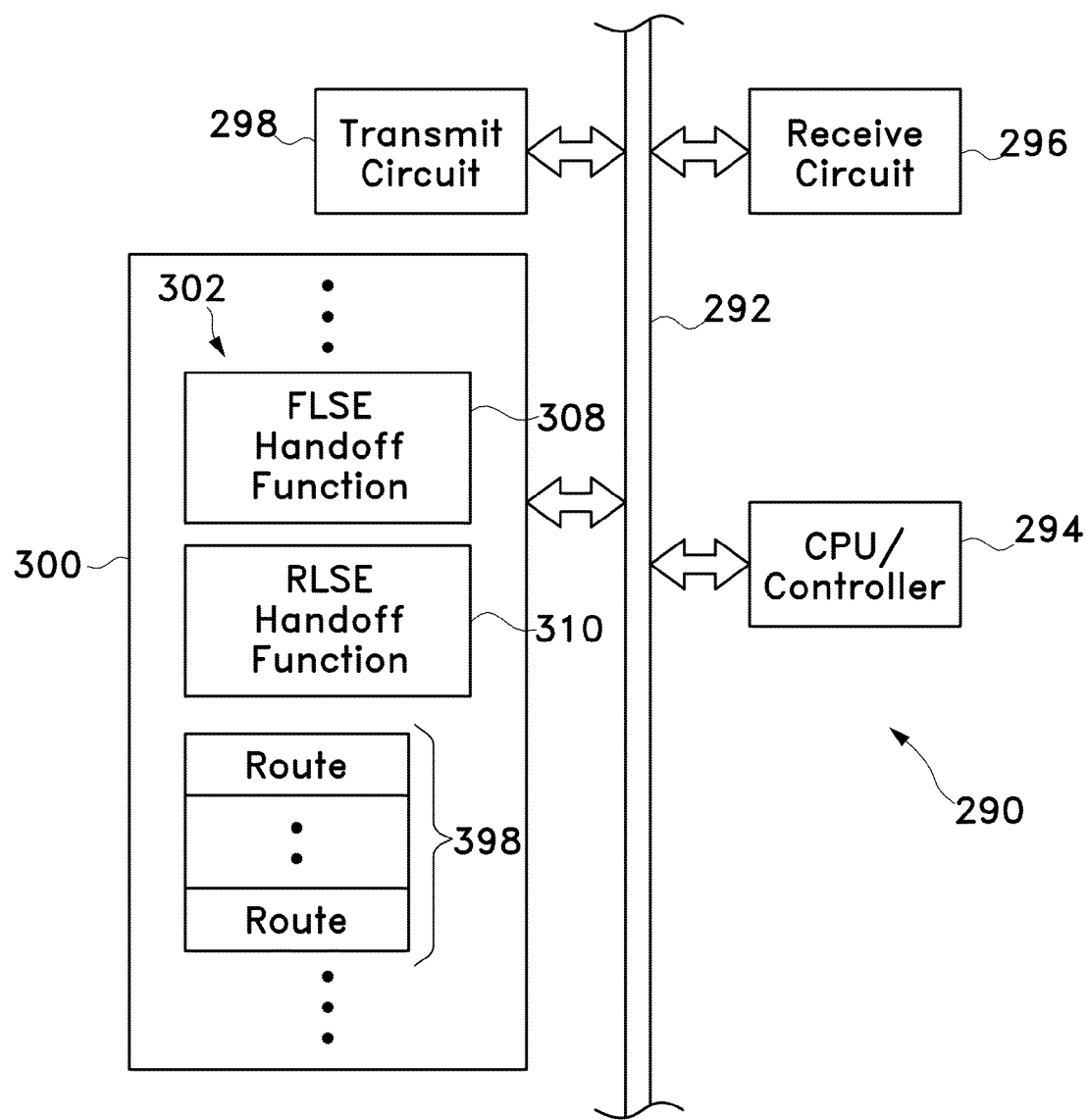
FIG. 6 is a schematic drawing of part of the hardware implementation of an apparatus for executing the handoff processes in accordance with the exemplary embodiment.

FIG. 6 shows the part of hardware implementation of an apparatus for executing the handoff processes as described above. The circuit apparatus is signified by the reference numeral 290 and can be implemented in an AT or any communication entities, such as an eBS or an AGW.

The apparatus 290 comprises a central data bus 292 linking several circuits together. The circuits include a CPU (Central Processing Unit) or a controller 294, a receive circuit 296, a transmit circuit 298, and a memory unit 300.

If the apparatus 290 is part of a wireless device, the receive and transmit circuits 296 and 298 can be connected to a RF (Radio Frequency) circuit but is not shown in the drawing. The receive circuit 296 processes and buffers received signals before sending out to the data bus 292. On the other hand, the transmit circuit 298 processes and buffers the data from the data bus 292 before sending out of the device 290. The CPU/controller 294 performs the function of data management of the data bus 292 and further the function of general data processing, including executing the instructional contents of the memory unit 300.

Instead of separately disposed as shown in FIG. 6, as an alternative, the transmit circuit 298 and the receive circuit 296 can be parts of the CPU/controller 294.

The memory unit 300 includes a set of modules and/or instructions generally signified by the reference numeral 302. In this embodiment, the modules/instructions include, among other things, a FLSE handoff function 308 and a RLSE handoff function 310. The handoff functions 308 and 310 include computer instructions or code for executing the process steps as shown and described in FIGS. 1-5. Specific instructions particular to an entity can be selectively implemented in the handoff functions 308 and 310. For instance, if the apparatus 290 is part of an AT, among other things, instructions for carrying out the process steps as shown and described in FIG. 1-5 along with the preparation and processing of the messages relevant to the AT as shown and described in FIGS. 2, 4 and 5, can be coded in the handoff functions 308 and 310. Similarly, if the apparatus 290 is part of a communication entity, for example an eBS, process steps and message preparations particular to that communication entity can be coded in the handoff functions 308 and 310.

In addition, a plurality of routes, such as the routes 34R, 36R and 38R as shown and described in FIG. 1 can also be included in the memory unit 300. The routes are collectively designated by the reference numeral 398 in FIG. 6. As an alternative, the routes 398 can be stored in one or more other memory units other than the unit 300. In a manner similarly as arranged above, selective routes can be installed for a particular entity in implementation. For example, while the AT needs to include all the routes that are in its RS, such as 34R, 36R and 38R as shown and described in FIG. 1 for the AT 54, as for the eBS 36 for instance, only the route 36R needs to be installed in the memory unit 300.

In this embodiment, the memory unit 300 is a RAM (Random Access Memory) circuit. The exemplary functions, such as the handoff functions 308 and 310, are software routines, modules and/or data sets. The memory unit 300 can be tied to another memory circuit (not shown) which can either be of the volatile or nonvolatile type. As an alternative, the memory unit 300 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

It should be further be noted that the inventive processes as described can also be coded as computer-readable instructions carried on any computer-readable medium known in the art. In this specification and the appended claims, the term "computer-readable medium" refers to any medium that participates in providing instructions to any processor, such as the CPU/controller 294 shown and described in the drawing figure of FIG. 6, for execution. Such a medium can be of the storage type and may take the form of a volatile or non- volatile storage medium as also described previously, for example, in the description of the memory unit 300 in FIG. 6. Such a medium can also be of the transmission type and may include a coaxial cable, a copper wire, an optical cable, and the air interface carrying acoustic, electromagnetic or optical waves capable of carrying signals readable by machines or computers. The computer-readable medium can be part of a computer product separate from the apparatus 290.

Finally, other changes are possible within the scope of the invention. Other than as described above, any other logical blocks, circuits, and algorithm steps described in connection with the embodiment can be implemented in hardware, software, firmware, or combinations thereof. It will be understood by those skilled in the art that theses and other changes in form and detail may be made therein without departing from the scope and spirit of the invention.

What is claimed is:

1. A method of communications, comprising:
providing assessment of a set of communication conditions;
allocating a forward communication link to a first communication entity based on said assessment;
allocating a reverse communication link to a second communication entity based on said assessment;
maintaining a route with one of the first and second communication entities upon initiation of a handoff from the one of the first and second communication entities to a third communication entity, wherein the route is a route through which Internet protocol (IP) packets are tunneled from the one of the first and second communication entities via the third communication entity;
providing another route for communications with the other of the first and second communication entities;
initiating the handoff from the one of the first and second communication entities to the third communication entity while maintaining communication with the other of the first and second communication entities;
processing a first partial IP data packet of a full IP data packet from the one of the first and second communication entities via the third communication entity using the route; and
processing a second partial IP data packet of the full IP data packet from the other of the first and second communication entities using the another route.

2. A method by an access terminal to efficiently utilize communication resources in a communication system, comprising:
providing a plurality of routes in said access terminal;
allocating a first route of the plurality of routes for communicating with a first communication entity;
allocating a second route of the plurality of routes for communicating with a second communication entity;
maintaining said first and second routes respectively associated with said first and second communication entities irrespective of which of said first and second communication entities are assigned as a serving communication entity;
allocating a third route of the plurality of routes for communicating with a third communication entity, the third route being through which Internet protocol (IP) packets are tunneled from the first communication entity via the third communication entity upon initiation of a handoff from the first communication entity to the third communication entity;

initiating the handoff from the first communication entity to the third communication entity while maintaining communication with the second communication entity using the second route;
processing a first partial IP data packet of a full IP data packet from the first communication entity using the first route; and
processing a second partial IP data packet of the full IP data packet from the first communication entity via the third communication entity using the third route.

3. The method as in claim 2, further comprising:
selecting said first communication entity as a forward-link serving communication entity;
selecting said second communication entity as a reverse-link serving communication entity; and
selecting the third communication entity instead of the first communication entity as the forward-link serving communication entity before the handoff from the first communication entity to the third communication entity.

4. The method as in claim 2, further comprising maintaining said first and second routes respectively associated with said first and second communication entities irrespective of whether said serving communication entity is a forward-link serving communication entity or a reverse-link serving communication entity.

5. The method as in claim 2, further comprising including in said first route parameters associated with a first communication session between said access terminal and said first communication entity, and including in said second route parameters associated with a second communication session between said access terminal and second communication entity.

6. A method by an access terminal operable in a communication system, comprising:
providing a plurality of routes in said access terminal;
allocating one of said routes for communicating with a first communication entity as a first route;
allocating another of said routes for communicating with a second communication entity as a second route;
maintaining said first and second routes respectively associating with said first and second communication entities irrespective of which of said first and second communication entities being assigned as a serving communication entity;
initially selecting said first communication entity as said serving communication entity;
afterward selecting said second communication entity as said serving communication entity, wherein said first communication entity is erroneously assigned as said serving communication entity; and
reselecting said second communication entity as said serving communication entity from remedial actions initially caused by one of said first and second communication entities.

7. A method by a communication entity for efficiently utilizing communication resources in a communication system, comprising:
serving as both a forward-link serving communication entity and a reverse-link serving communication entity for an access terminal in said communication system;
receiving notification from another communication entity for handoff of one of said forward-link and reverse-link communication entities to said another communication entity, wherein said notification is a request for handoff of said forward-link communication entity to said another communication entity;
continually serving said access terminal as the other of said forward-link and reverse-link communication entities;
maintaining a route for processing Internet protocol (IP) data packets with said access terminal; and
tunneling partial IP data packets via said another communication entity to said access terminal using said route.

8. A method by a communication entity operable in a communication system, comprising:
serving as both a forward-link serving communication entity and a reverse-link serving communication entity for an access terminal in said communication system;
receiving notification from another communication entity for handoff of one of said forward-link and reverse-link communication entities to said another communication entity, wherein said notification is a request for handoff of said forward-link communication entity to said another communication entity;
continually serving said access terminal as the other of said forward-link and reverse-link communication entities;
maintaining a route for processing IP (Internet Protocol) data packets with said access terminal;
sending full IP data packets to said another communication entity; and
tunneling partial IP data packets via said another communication entity to said access terminal using said route.

9. An apparatus for communications, comprising:
means for providing assessment of a set of communication conditions;
means for allocating a forward communication link to a first communication entity based on said assessment;
means for allocating a reverse communication link to a second communication entity based on said assessment;
means for maintaining a route with one of the first and second communication entities upon initiation of a handoff from the one of the first and second communication entities to a third communication entity, wherein the route is a route through which Internet protocol (IP) packets are tunneled from the one of the first and second communication entities via the third communication entity;
means for providing another route for communications with the other of the first and second communication entities;
means for initiating the handoff from the one of the first and second communication entities to the third communication entity while maintaining communication with the other of the first and second communication entities;
means for processing a first partial IP data packet of a full IP data packet from the one of the first and second communication entities via the third communication entity using the route; and
means for processing a second partial IP data packet of the full IP data packet from the other of the first and second communication entities using the another route.

10. An access terminal for efficiently utilizing communication resources in a communication system, comprising:
means for providing a plurality of routes in said access terminal;
means for allocating a first route of the plurality of routes for communicating with a first communication entity;
means for allocating a second route of the plurality of routes for communicating with a second communication entity;
means for maintaining said first and second routes respectively associated with said first and second communication entities irrespective of which of said first and second communication entities are assigned as a serving communication entity;

means for allocating a third route of the plurality of routes for communicating with a third communication entity, the third route being through which Internet protocol (IP) packets are tunneled from the first communication entity via the third communication entity upon initiation of a handoff from the first communication entity to the third communication entity;

means for initiating the handoff from the first communication entity to the third communication entity while maintaining communication with the second communication entity using the second route;

means for processing a first partial IP data packet of a full IP data packet from the first communication entity using the first route; and means for processing a second partial IP data packet of the full IP data packet from the first communication entity via the third communication entity using the third route.

11. The access terminal as in claim 10, further comprising:
means for selecting said first communication entity as a forward-link serving communication entity;
means for selecting said second communication entity as a reverse-link serving communication entity; and
means for selecting the third communication entity instead of the first communication entity as the forward-link serving communication entity before the handoff from the first communication entity to the third communication entity.

12. The access terminal as in claim 10, further comprising means for maintaining said first and second routes respectively associated with said first and second communication entities irrespective of whether said serving communication entity is a forward-link serving communication entity or a reverse-link serving communication entity.

13. The access terminal as in claim 10, further comprising:
means for including in said first route parameters associated with a first communication session between said access terminal and said first communication entity; and
means for including in said second route parameters associated with a second communication session between said access terminal and second communication entity.

14. An access terminal operable in a communication system, comprising:
means for providing a plurality of routes in said access terminal;
means for allocating one of said routes for communicating with a first communication entity as a first route;
means for allocating another of said routes for communicating with a second communication entity as a second route;
means for maintaining said first and second routes respectively associating with said first and second communication entities irrespective of which of said first and second communication entities being assigned as a serving communication entity;
means for initially selecting said first communication entity as said serving communication entity;
means for selecting afterward said second communication entity as said serving communication entity, wherein the first communication entity is erroneously assigned as said serving communication entity; and
means for reselecting said first communication entity as said serving communication entity.

15. A communication entity for efficiently utilizing communication resources in a communication system, comprising:
means for serving as both a forward-link serving communication entity and a reverse-link serving communication entity for an access terminal in said communication system;
means for receiving notification from another communication entity for handoff of one of said forward-link and reverse-link communication entities to said another communication entity, wherein said notification is a request for handoff of said forward-link communication entity to said another communication entity;
means for continually serving said access terminal as the other of said forward-link and reverse-link communication entities;
means for maintaining a route for processing Internet protocol data packets with said access terminal; and
means for tunneling partial IP data packets via said another communication entity to said access terminal using said route.

16. A communication entity operable in a communication system, comprising:
means for serving as both a forward-link serving communication entity and a reverse-link serving communication entity for an access terminal in said communication system;
means for receiving notification from another communication entity for handoff of one of said forward-link and reverse-link communication entities to said another communication entity, wherein said notification is a request for handoff of said forward-link communication entity to said another communication entity;
means for continually serving said access terminal as the other of said forward-link and reverse-link communication entities;
means for maintaining a route for processing IP (Internet Protocol) data packets with said access terminal;
means for sending full IP data packets to said another communication entity; and
means for tunneling partial IP data packets via said another communication entity to said access terminal using said route.

17. An apparatus for communications, comprising:
a processor; and
circuitry coupled to said processor configured to:
provide assessment of a set of communication conditions;
allocate a forward communication link to a first communication entity based on said assessment;
allocate a reverse communication link to a second communication entity based on said assessment;
maintain a route with one of the first and second communication entities upon initiation of a handoff from the one of the first and second communication entities to a third communication entity, wherein the route is a route through which Internet protocol (IP) packets are tunneled from the one of the first and second communication entities via the third communication entity;
provide another route for communications with the other of the first and second communication entities;
initiate the handoff from the one of the first and second communication entities to the third communication entity while maintaining communication with the other of the first and second communication entities;

process a first partial IP data packet of a full IP data packet from the one of the first and second communication entities via the third communication entity using the route; and process a second partial IP data packet of the full IP data packet from the other of the first and second communication entities using the another route.

18. An access terminal for efficiently utilizing communication resources in a communication system, comprising:

a processor; and circuitry coupled to said processor configured to:

provide a plurality of routes in said access terminal;

allocate a first route of the plurality of routes for communicating with a first communication entity;

allocate a second route of the plurality of routes for communicating with a second communication entity;

maintain said first and second routes respectively associated with said first and second communication entities irrespective of which of said first and second communication entities are assigned as a serving communication entity;

allocate a third route of the plurality of routes for communicating with a third communication entity, the third route being through which Internet protocol (IP) packets are tunneled from the first communication entity via the third communication entity upon initiation of a handoff from the first communication entity to the third communication entity;

initiate the handoff from the first communication entity to the third communication entity while maintaining communication with the second communication entity using the second route;

process a first partial IP data packet of a full IP data packet from the first communication entity using the first route; and process a second partial IP data packet of the full IP data packet from the first communication entity via the third communication entity using the third route.

19. The access terminal as in claim 18, wherein said circuitry coupled to said processor is further configured to:

select said first communication entity as a forward-link serving communication entity;

select said second communication entity as a reverse-link serving communication entity; and select the third communication entity instead of the first communication entity as the forward-link serving communication entity before the handoff from the first communication entity to the third communication entity.

20. The access terminal as in claim 18, wherein said circuitry coupled to said processor is further configured to maintain said first and second routes respectively associated with said first and second communication entities irrespective of whether said serving communication entity is a forward-link serving communication entity or a reverse-link serving communication entity.

21. The access terminal as in claim 18, wherein said circuitry coupled to said processor is further configured to include in said first route parameters associated with a first communication session between said access terminal and said first communication entity, and include in said second route parameters associated with a second communication session between said access terminal and second communication entity.

22. An access terminal operable in a communication system, comprising:

a processor; and circuitry coupled to said processor configured to provide a plurality of routes in said access terminal, allocate one of said routes for communicating with a first communication entity as a first route, allocate another of said routes for communicating with a second communication entity as a second route, and maintain said first and second routes respectively associating with said first and second communication entities irrespective of which of said first and second communication entities being assigned as a serving communication entity, wherein said circuitry coupled to said processor being further configured to initially select said first communication entity as said serving communication entity, select afterward said second communication entity as said serving communication entity, and if said first communication entity is erroneously assigned as said serving communication entity, reselect said second communication entity as said serving communication entity.

23. A communication entity for efficiently utilizing communication resources in a communication system, comprising:

a processor; and circuitry coupled to said processor configured to serve as both a forward-link serving communication entity and a reverse-link serving communication entity for an access terminal in said communication system, receive notification from another communication entity for handoff of one of said forward-link and reverse-link communication entities to said another communication entity, wherein said notification is a request for handoff of said forward-link communication entity to said another communication entity, continually serve said access terminal as the other of said forward-link and reverse-link communication entities, maintain a route for processing Internet protocol (IP) data packets with said access terminal, and tunnel partial IP data packets via said another communication entity to said access terminal using said route.

24. A communication entity operable in a communication system, comprising:

a processor; and circuitry coupled to said processor configured to serve as both a forward-link serving communication entity and a reverse-link serving communication entity for an access terminal in said communication system, receive notification from another communication entity for handoff of one of said forward-link and reverse-link communication entities to said another communication entity, continually serve said access terminal as the other of said forward-link and reverse-link communication entities, wherein said notification is a request for handoff of said forward-link communication entity to said another communication entity, wherein said processor coupled to said circuitry being further configured to maintain a route for processing IP (Internet Protocol) data packets with said access terminal, send full IP data packets to said another communication entity, and tunnel partial IP data packets via said another communication entity to said access terminal using said route.

25. A computer product including a non-transitory computer-readable medium comprising physically embodied computer-readable code for:

providing assessment of a set of communication conditions;

allocating a forward communication link to a first communication entity based on said assessment;
allocating a reverse communication link to a second communication entity based on said assessment;
maintaining a route with one of the first and second communication entities upon initiation of a handoff from the one of the first and second communication entities to a third communication entity, wherein the route is a route through which Internet protocol (IP) packets are tunneled from the one of the first and second communication entities via the third communication entity;
providing another route for communications with the other of the first and second communication entities;
initiating the handoff from the one of the first and second communication entities to the third communication entity while maintaining communication with the other of the first and second communication entities;
processing a first partial IP data packet of a full IP data packet from the one of the first and second communication entities via the third communication entity using the route; and
processing a second partial IP data packet of the full IP data packet from the other of the first and second communication entities using the another route.

26. A computer product including a non-transitory computer-readable medium comprising physically embodied computer-readable code for:
providing a plurality of routes in an access terminal;
allocating a first route of the plurality of routes for communicating with a first communication entity;
allocating a second route of the plurality of routes for communicating with a second communication entity;
maintaining said first and second routes respectively associated with said first and second communication entities irrespective of which of said first and second communication entities are assigned as a serving communication entity;
allocating a third route of the plurality of routes for communicating with a third communication entity, the third route being through which Internet protocol (IP) packets are tunneled from the first communication entity via the third communication entity upon initiation of a handoff from the first communication entity to the third communication entity;
initiating the handoff from the first communication entity to the third communication entity while maintaining communication with the second communication entity using the second route;
processing a first partial IP data packet of a full IP data packet from the first communication entity using the first route; and
processing a second partial IP data packet of the full IP data packet from the first communication entity via the third communication entity using the third route.

27. The computer product as in claim 26, wherein said non-transitory computer-readable medium further comprising computer-readable code for:
selecting said first communication entity as a forward-link serving communication entity;
selecting said second communication entity as a reverse-link serving communication entity; and
selecting the third communication entity instead of the first communication entity as the forward-link serving communication entity before the handoff from the first communication entity to the third communication entity.

28. The computer product as in claim 26, wherein said non-transitory computer-readable medium further comprises computer-readable code for maintaining said first and second routes respectively associated with said first and second communication entities irrespective of whether said serving communication entity is a forward-link serving communication entity or a reverse-link serving communication entity.

29. The computer product as in claim 26, wherein said non-transitory computer-readable medium further comprises computer-readable code for including in said first route parameters associated with a first communication session between said access terminal and said first communication entity, and including in said second route parameters associated with a second communication session between said access terminal and second communication entity.

30. A computer product including a non-transitory computer-readable medium comprising physically embodied computer-readable code for:
providing a plurality of routes in said access terminal;
allocating one of said routes for communicating with a first communication entity as a first route;
allocating another of said routes for communicating with a second communication entity as a second route;
maintaining said first and second routes respectively associating with said first and second communication entities irrespective of which of said first and second communication entities being assigned as a serving communication entity;
initially selecting said first communication entity as said serving communication entity;
afterward selecting said second communication entity as said serving communication entity, wherein said first communication entity is erroneously assigned as said serving communication entity; and
reselecting said second communication entity as said serving communication entity from remedial actions initially caused by one of said first and second communication entities.

31. A computer product including a non-transitory computer-readable medium comprising physically embodied computer-readable code for:
serving as both a forward-link serving communication entity and a reverse-link serving communication entity for an access terminal in a communication system;
receiving notification from another communication entity for handoff of one of said forward-link and reverse-link communication entities to said another communication entity, wherein said notification is a request for handoff of said forward-link communication entity to said another communication entity;
continually serving said access terminal as the other of said forward-link and reverse-link communication entities;
maintaining a route for processing Internet protocol (IP) data packets with said access terminal; and
tunneling partial IP data packets via said another communication entity to said access terminal using said route.

32. A computer product including a non-transitory computer-readable medium comprising physically embodied computer-readable code for:
serving as both a forward-link serving communication entity and a reverse-link serving communication entity for an access terminal in said communication system;
receiving notification from another communication entity for handoff of one of said forward-link and reverse-link communication entities to said another communication entity, wherein said notification is a request for handoff of said forward-link communication entity to said another communication entity;

continually serving said access terminal as the other of said forward-link and reverse-link communication entities;

maintaining a route for processing IP (Internet Protocol) data packets with said access terminal;

sending full IP data packets to said another communication entity; and tunneling partial IP data packets via said another communication entity to said access terminal using said route.

* * * * *